June 18, 1963     W. R. SCHERER     3,094,453
METHOD AND APPARATUS FOR MAKING LAMINATED SHEETS
Filed June 22, 1960     2 Sheets-Sheet 1

INVENTOR.
WAYNE R. SCHERER
BY
ATTORNEYS

June 18, 1963 W. R. SCHERER 3,094,453
METHOD AND APPARATUS FOR MAKING LAMINATED SHEETS
Filed June 22, 1960 2 Sheets-Sheet 2

*INVENTOR.*
WAYNE R. SCHERER
BY
ATTORNEYS

United States Patent Office 3,094,453
Patented June 18, 1963

3,094,453
METHOD AND APPARATUS FOR MAKING LAMINATED SHEETS
Wayne R. Scherer, 1108 E. Miramar Ave., Claremont, Calif.
Filed June 22, 1960, Ser. No. 37,904
1 Claim. (Cl. 156—494)

This invention relates to a method and apparatus for making laminated sheets. In particular, the invention is of great utility in forming relatively long laminated sheets.

In accordance with this invention, long laminated sheets can be formed rapidly and economically. This invention is further advantageous since it provides for the ready formation of long laminated sheets of a wide variety of thicknesses.

The invention and its objects will be fully understood by reading the following description in conjunction with the drawings in which FIGURE 1 is a side elevation of apparatus in accordance with this invention.

FIGURE 4 is an enlarged view of a laminating drum showing the feeding of a plurality of sheets of material to the nip of the metal band wound on the laminating drum.

Figure 1:
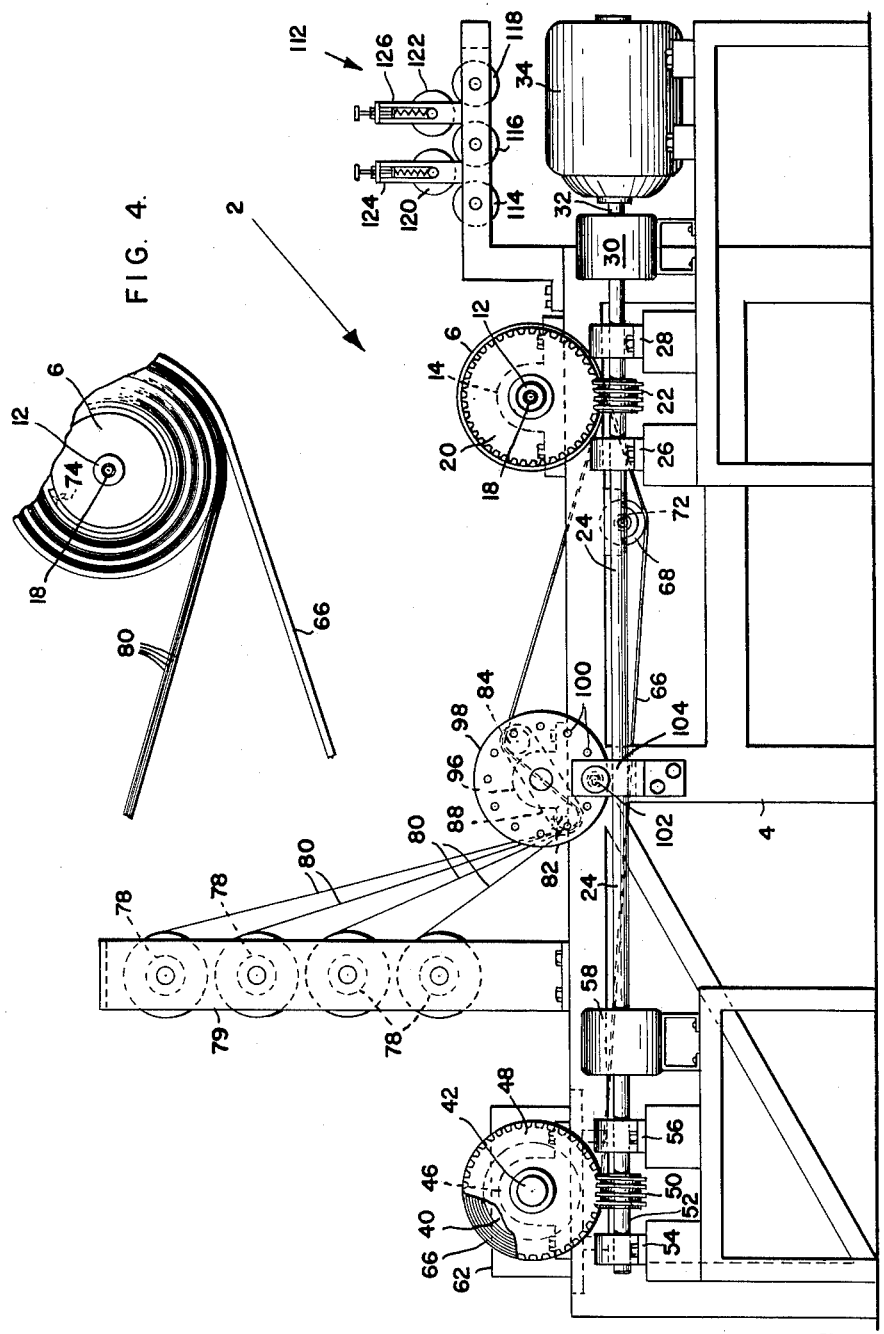
Figure 2:
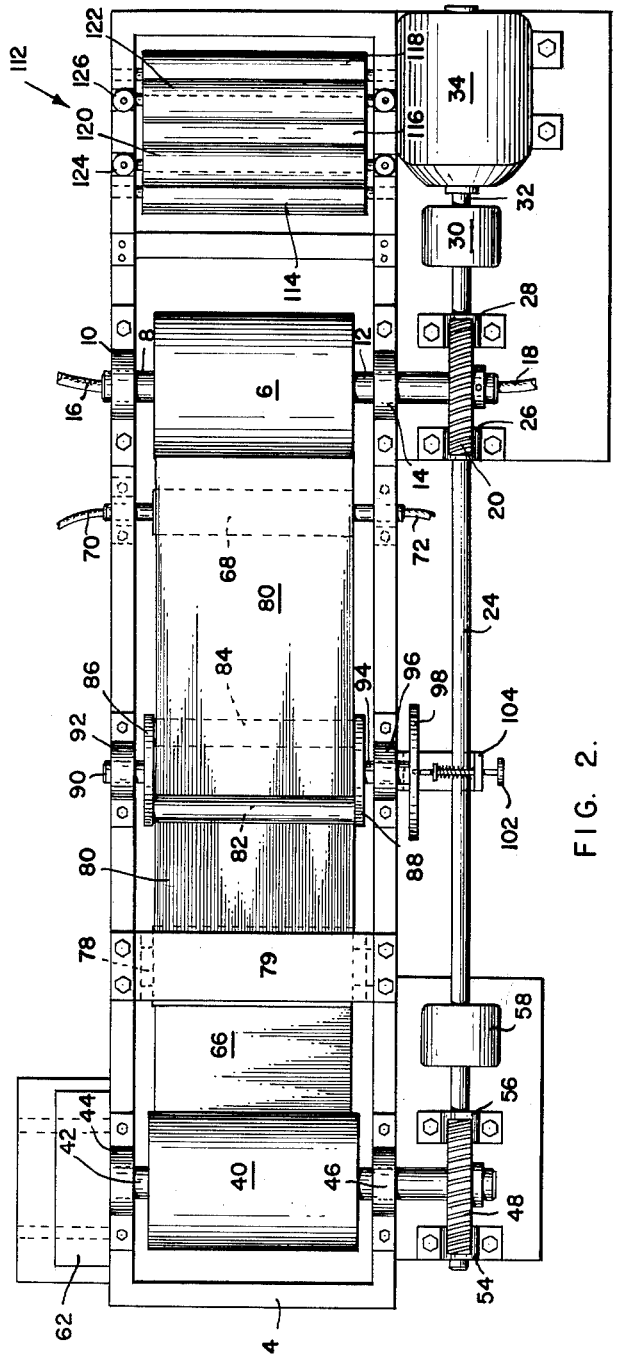
FIGURE 2 is a plan view of the apparatus of FIGURE 1.
Figure 3:
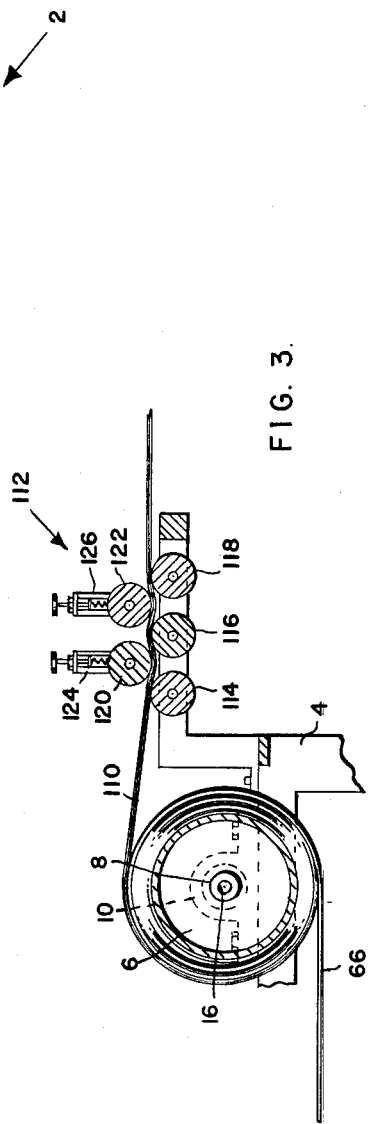
FIGURE 3 is an enlarged view of the laminating drum of apparatus of FIGURE 1, showing the formed laminated sheet being removed.

Referring now to FIGURES 1 and 2, a laminator 2 which is suitable for carrying out the method of this invention, has a frame 4 on which is mounted a lamiating drum 6. Drum 6 is rotatably supported by a hollow shaft 8 carried by bearing 10 and hollow shaft 12 carried by bearing 14. Drum 6 is supplied with steam or alternatively a cooling liquid such as cool water by line 16 which is connected to shaft 8. A line 18 which is connected to shaft 12 acts to exhaust the fluid supplied to drum 6.

A gear 20 secured to shaft 12 is driven by a worm gear 22 mounted on shaft 24, which is carried by bearings 26 and 28. Shaft 24 is connected to a transmission indicated at 30, which is driven by shaft 32 of electric motor 34. Transmission 30 provides for the reversing of the direction of drive of drum 6 as well as the de-clutching of drum 6 from motor 34 when desired.

A reel 40 is mounted for rotation on a shaft 42, carried by bearings 44 and 46. Shaft 42 is driven by gear 48 secured to shaft 42, gear 48 in turn being driven by worm gear 50 secured to shaft 52 carried by bearings 54 and 56. Shaft 52 is connected to a clutch indicated at 58 which in turn is connected to shaft 24.

Shaft 42 is also connected to a brake indicated at 62 which incorporates a torque indicator.

A flexible band 66 capable of withstanding temperature and tension to exert a compressive hood on drum 6 is coiled on reel 40. Suitable materials for band 66 are metals such as steel, copper, aluminum, titanium, or a synthetic resin such as Teflon (polytetrafluoroethylene) or Kel-F (polytrifluorochloroethylene), nylon or canvas or wire reinforced rubber. Band 66 passes over hollow roller 68 which is heated by steam supplied by supply line 70 and exhausted through line 72. The free end of band 66 is secured to laminating drum 6, as indicated at 74.

A plurality of supply rolls 78 are mounted for rotation on frame 79 which is secured to frame 4. Each roll 78 has wound thereon a resin impregnated sheet 80. The sheets 80 can be any of the conventional well known sheets employed for forming laminated sheets. Thus, for example, they can be paper pulpboard or non-woven or woven sheets of cotton, rayon, metal, glass, asbestos, acrylic, vinyl, polyester or polyamide (nylon) fibers impregnated with a thermosetting resin, for example, a phenolic resin such as phenol formaldehyde or phenol furfural resin, an epoxy resin, for example, the reaction product of epichlorohydrin and bisphenol-A, a polyester resin or a melamine resin.

The thermosetting resin can, of course, include other organic or inorganic ingredients such as, for example, a thermoplastic resin modifier, inorganic fillers such as cryolite or fused aluminum oxide or a reinforcement such as screen, for example, of metal.

Sheet 80 passes under tensioning roll 82 and over tensioning roll 84. The tensioning rolls 82 and 84 are mounted for rotation on plates 86 and 88. Plate 86 is secured to shaft 90 which is mounted for rotation in bearing 92. Plate 88 is secured to shaft 94 which is mounted for rotation in bearing 96. Shaft 94 is secured to plate 98 which is provided with securing openings 100, one of which is engaged by spring biased plunger 102 in order to secure the tensioning rolls 82 and 84 in the proper position to achieve the desired tension. Spring biased plunger 102 is mounted on bracket 104 which is secured to frame 4.

The plurality of sheets 80 pass from tensioning roll 84 to the nip of metal band 66 and are wound onto drum 6 between adjacent wraps of band 66 wound onto drum 6.

Curing of the resin in sheets 80 is accomplished by the heat supplied to drum 6 by introducing steam from line 16, metal band 66 having been heated so as to not exert any cooling effect on the sheets 80. The necessary pressure on the sheets to form the laminate is exerted by the compression of adjacent wraps of the drum incident to the tensioning of metal band 66 by brake 62.

After the desired number of wraps of sheets 80 have been rolled onto drum 6, motor 34 is stopped and the material is permitted to remain on the drum until the resin is fully cured. During this period care must be taken to insure that the tension maintained on band 66 is not permitted to lessen substantially due to the compression of the sheets 80 together. This condition can readily be controlled by keeping a close watch on the torque indicator incorporated in brake 62 and employing motor 34 to increase the torque to the desired figure whenever it drops below this figure. It will be understood that during the operation thus far the clutch 58 will keep the shaft 24 and 52 disconnected.

When the resin is cured which, of course, will depend upon the resin selected and the curing temperature, all of which is well known in the laminating art and hence need not be recited in any great detail here, the drum 6 is cooled by introducing a cooling fluid such as cool water through line 16, the sheets 80 will be severed adjacent drum 6, brake 62 will be released and clutch 58 will be engaged. Transmission 30 will be reversed and motor 34 started up. This will cause metal band 66 to be rewound onto the reel 40. As the completed laminated sheet 110 is unrolled from drum 6 it is led through a straightener shown schematically at 112 which comprises lower rolls 114, 116, and 118 and upper rolls 120 and 122. The upper rolls 120 and 122 are spring biased downwardly, as indicated schematically at 124 and 126. The straightener acts to eliminate the arcuate set of the laminated sheet 110, resulting from the curing of the resin on drum 6. It is frequently convenient to store or ship the formed resin sheet 110 in the form of a coil in which event the straightener 112 is by-passed and the sheet 110 is coiled onto a roll.

It will be appreciated that if desired chopped or macerated materials could be sandwiched between the plies formed by sheets 80. The apparatus is also useful for laminating wood veneers which is accomplished by substituting adhesive coated sheets of veneer.

The following table is illustrative of synthetic resins and satisfactory ranges of conditions for carrying out the process of this invention:

| Resins | Cure Temp., °F. | Compressive Pressing Range on Piled Sheets, p.s.i. | Tension Range, lbs./in. width of flexible band |
|---|---|---|---|
| Phenolic | 250-350 | 10-2,000 | 100-20,000 |
| Furfural | 150-300 | 10-1,000 | 100-10,000 |
| Epoxy | 150-350 | 10-1,000 | 100-10,000 |
| Melamine | 250-300 | 50-1,500 | 500-15,000 |
| Urea | 200-300 | 100-1,000 | 1,000-10,000 |
| Silicones | 300-500 | 500-1,500 | 5,000-15,000 |
| Alkyd | 250-350 | 500-1,000 | 5,000-10,000 |
| Vinyls | 250-375 | 50-1,000 | 500-10,00 |
| Acrylates | 250-375 | 100-1,000 | 1,000-10,000 |
| Polyester | 100-325 | 10-500 | 100-5,000 |

It is not desired to be limited except as set forth in the following claim.

What is claimed is:

Apparatus for forming relatively long lengths of laminated sheets comprising a laminating drum, means to control the temperature of said drum, means to rotate said drum, a reel spaced from said drum, a flexible band coiled on said reel and having its free end secured to said drum, means to heat said band prior to its being wound on said drum, means to place said band under tension, means to supply a plurality of resin impregnated sheets to the nip of the band on the laminating drum for winding on the drum between wraps of the band.

References Cited in the file of this patent

UNITED STATES PATENTS

| | | |
|---|---|---|
| 1,969,232 | Nixon | Aug. 7, 1934 |
| 2,320,513 | Drummond | June 1, 1943 |
| 2,594,229 | Snyder et al. | Apr. 22, 1952 |
| 2,740,741 | Vaughan et al. | Apr. 3, 1956 |
| 2,981,309 | Loges | Apr. 25, 1961 |
| 3,026,230 | Nebout | Mar. 20, 1962 |